US011914679B2

(12) United States Patent
Low et al.

(10) Patent No.: US 11,914,679 B2
(45) Date of Patent: Feb. 27, 2024

(54) MULTISPECTRAL OBJECT-DETECTION WITH THERMAL IMAGING

(71) Applicant: Aptiv Technologies Limited, St. Michael (BB)

(72) Inventors: Yew Kwang Low, Singapore (SG); Ronald M. Taylor, Greentown, IN (US); Ward K. Everly, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 341 days.

(21) Appl. No.: 17/394,903

(22) Filed: Aug. 5, 2021

(65) Prior Publication Data
US 2022/0300773 A1 Sep. 22, 2022

Related U.S. Application Data

(60) Provisional application No. 63/162,678, filed on Mar. 18, 2021.

(51) Int. Cl.
*G06K 9/62* (2022.01)
*G06K 9/00* (2022.01)
(Continued)

(52) U.S. Cl.
CPC .............. *G06F 18/251* (2023.01); *G01J 5/00* (2013.01); *G01S 17/08* (2013.01); *G01S 17/86* (2020.01);
(Continued)

(58) Field of Classification Search
CPC ......... G06F 18/251; G06T 7/38; G06T 7/269; G06T 2207/10021; G06T 2207/10028;
(Continued)

(56) References Cited

U.S. PATENT DOCUMENTS 5,633,705 A 5/1997 Asayama
7,499,638 B2 3/2009 Arai et al.
(Continued)

OTHER PUBLICATIONS

"Extended European Search Report", EP Application No. 22159214.0, dated Nov. 3, 2022, 15 pages.
(Continued)

*Primary Examiner* — Edward F Urban
*Assistant Examiner* — Jongbong Nah
(74) *Attorney, Agent, or Firm* — Harness, Dickey & Pierce, P.L.C.

(57) ABSTRACT

This document describes techniques, apparatuses, and systems for enabling multispectral object-detection with thermal imaging. A thermal sensor, a multispectral stereo camera system, and an illumination system are used in combination to provide a multispectral object-detection system for use with safety or driving systems for autonomous and semi-autonomous vehicles. The illumination system can provide illumination for the stereo camera system and serve as a range-finder that can determine a distance between the stereo camera system and an object in the system's field-of-view. The stereo camera system can include one or more of various camera or sensor technologies, including infrared or near-infrared, thermal imaging, or visible light. The system can be used to detect objects in the field-of-view, determine a distance to the object, and estimate the object's size and relative motion. The system can reduce costs and resource usage while enabling accurate, high-quality object-detections for safety and autonomous or semi-autonomous control.

20 Claims, 8 Drawing Sheets

(51) Int. Cl.
*G06T 7/269* (2017.01)
*G06T 7/38* (2017.01)
*G01S 17/08* (2006.01)
*G01J 5/00* (2022.01)
*G01S 17/931* (2020.01)
*G01S 17/86* (2020.01)
*G06F 18/25* (2023.01)
*G06V 20/58* (2022.01)
*G06V 20/10* (2022.01)
*G01J 5/48* (2022.01)

(52) U.S. Cl.
CPC ............ *G01S 17/931* (2020.01); *G06T 7/269* (2017.01); *G06T 7/38* (2017.01); *G06V 20/182* (2022.01); *G06V 20/58* (2022.01); *G01J 5/48* (2013.01); *G01J 2005/0077* (2013.01); *G06T 2207/10021* (2013.01); *G06T 2207/10028* (2013.01); *G06T 2207/10048* (2013.01); *G06V 20/194* (2022.01)

(58) Field of Classification Search
CPC ......... G06T 2207/10048; G01S 17/931; G01S 17/86; G01S 17/08; G06V 20/58; G06V 20/182; G06V 20/194; G01J 5/00; G01J 5/48; G01J 2005/0077
See application file for complete search history.

(56) References Cited

U.S. PATENT DOCUMENTS

| | | |
|---|---|---|
| 9,247,215 B1 | 1/2016 | Athan |
| 10,161,866 B2 | 12/2018 | Knox et al. |
| 10,830,887 B2 | 11/2020 | Low et al. |
| 2006/0072914 A1 | 4/2006 | Arai et al. |
| 2017/0146454 A1 | 5/2017 | Knox et al. |
| 2017/0270375 A1* | 9/2017 | Grauer ............... H04N 23/11 |
| 2019/0227168 A1 | 7/2019 | Low et al. |
| 2019/0235511 A1* | 8/2019 | Tiwari ............... G06Q 10/087 |
| 2020/0389606 A1* | 12/2020 | Petilli ............... G01S 7/4876 |

OTHER PUBLICATIONS

"Partial European Search Report", EP Application No. 22159214.0, dated Aug. 2, 2022, 16 pages.

"European Search Report", EP Application No. 19151691.3, dated May 29, 2019, 2 pages.

"Non-Final Office Action", U.S. Appl. No. 15/877,512, dated Apr. 8, 2020, 8 pages.

"Notice of Allowance", U.S. Appl. No. 15/877,512, dated Jul. 23, 2020, 7 pages.

* cited by examiner

700

```
┌─────────────────────────────────────────────────┐
│ Receive thermal data from a thermal sensor, the │
│ thermal data based on thermal radiation         │
│ detected by the thermal sensor and emitted      │
│ from an object in a field-of-view (FOV) of the  │
│ thermal sensor, from a background around the    │
│ object, or from both the object and the         │
│ background                                      │
│                      702                        │
└─────────────────────────────────────────────────┘
                         ↓
┌─────────────────────────────────────────────────┐
│ Receive non-thermal data from a non-thermal     │
│ sensor, the non-thermal data based on           │
│ non-thermal radiation associated with the       │
│ object and detected by the non-thermal sensor   │
│                      704                        │
└─────────────────────────────────────────────────┘
                         ↓
┌─────────────────────────────────────────────────┐
│ Detect the object based on either or both of    │
│ the thermal data or the non-thermal data        │
│                      706                        │
└─────────────────────────────────────────────────┘
                         ↓
┌─────────────────────────────────────────────────┐
│ Determine a distance between the object         │
│ detection system and the object based on at     │
│ least one of the thermal data or the            │
│ non-thermal data.                               │
│                      708                        │
└─────────────────────────────────────────────────┘
                         ↓
                        (A)
```

Receive dynamic NIR range data from an active near-infrared (NIR) range-finder, the active NIR range-finder comprising an emitter configured to emit NIR radiation and a detector configured to detect a portion of the NIR radiation reflected from the object over a time period and provide the dynamic NIR range data based on the detected portion of the NIR radiation reflected from the object
710

Receive the thermal data from the thermal sensor over the time period, the thermal data comprising sequential differential temperature data
712

Determine a temperature gradient between the object and the background, over the time period, the temperature gradient based on at least the sequential differential temperature data
714

Verify that the object exists based on at least the dynamic NIR range data and the temperature gradient.
716

*FIG. 7-2*

MULTISPECTRAL OBJECT-DETECTION WITH THERMAL IMAGING

CROSS-REFERENCE TO RELATED APPLICATION

This application claims the benefit under 35 U.S.C. 119(e) of U.S. Provisional Application No. 63/162,678, filed Mar. 18, 2021, the disclosure of which is incorporated by reference in its entirety herein.

BACKGROUND

Autonomous and semi-autonomous driving and safety systems can use perception systems to detect objects in their environment. Perception systems can include cameras and other sensors, such as light detection and ranging (LIDAR), to identify pedestrians, vehicles, and other objects, which may present a risk of collision. While LIDAR systems can be useful, they include laser light sources, higher-sensitivity sensors, and fast-response sensor capabilities, which can increase the costs of a perception system or associated device. Additionally, detecting and tracking objects using a LIDAR system represents a complex data-processing task, particularly to support driving or safety systems of a vehicle, which can impact memory space and processor resources, resulting in an increased cost. Some perception systems may be too expensive for some classes of vehicles, which may force a consumer to unnecessarily choose between driving safety and saving costs.

SUMMARY

This document describes techniques and systems for enabling multispectral object-detection with thermal imaging. This document also describes methods performed by the summarized techniques and systems set forth herein, as well as means for performing these methods. For clarity in this document, the term "AV" will be used to mean an autonomous vehicle, a semi-autonomous vehicle, or a manually operated vehicle that includes automated safety or warning features. An AV, as used herein, includes ground and/or aerial vehicles (e.g., drones). For ease of explanation, the disclosure is described primarily in the context of ground vehicles (e.g., trucks, cars, automobiles) configured to drive on and off roads, including passenger-less vehicles (e.g., robot delivery vehicles) and driver-less vehicles configured to drive based on little to no input from an occupant, other than spoken or computer-input to indicate a desired address, route, or final destination.

Through enabling multispectral object-detection with thermal imaging, an illumination system and a binary stereo camera system can be used in combination to provide input to driving systems to aid in safety, and autonomous or semi-autonomous control. The illumination system can both provide illumination for the stereo camera system and serve as a range-finder that can determine a distance between the stereo camera system and an object in the system's field-of-view (FOV). The stereo camera system can include one or more of various camera technologies, including infrared (e.g., near-infrared radiation (NIR)), thermal imaging, or visible light.

For example, an AV can include a multispectral camera system with a thermal sensor and two active NIR cameras. In this configuration, the camera system can be used to detect an object in its FOV, determine a distance to the object, and estimate the object's size and relative motion. To detect the object (or discriminate the object from the background), emitters on the NIR cameras illuminate the FOV with NIR radiation and the NIR cameras capture NIR images of the FOV. Similarly, the (passive) thermal sensor captures thermal images of the FOV. The NIR and thermal images can be used to detect objects in the FOV (e.g., using a pattern-matching algorithm) for the AV to avoid, such as pedestrians. Further, the thermal sensor can detect emissions from both objects in the FOV and from the background around the objects. Because there is typically a temperature difference between the background and the object, the thermal sensor can collect data over time and determine a sequential differential temperature difference across the edges of the object, which allows accurate object-detection. Additionally, as the multispectral camera system uses the range-finding capabilities of the NIR emitters to map the FOV (e.g., scan for potential objects), the thermal imaging incorporated within multispectral camera system can verify whether objects are to be avoided as the AV drives in an environment.

Distances to the detected objects can be detected in several ways. For example, thermal images from the thermal sensor, along with NIR images from the NIR cameras, can be used with stereoscopic camera techniques to calculate the distances. Further, the NIR emitter/detector system can determine the distances to the detected objects using time-of-flight or stereo-ranging techniques (e.g., without thermal images). In this way, the described systems and techniques can reduce processor usage and memory usage, which can reduce cost, while still ensuring accurate and high-quality object-detections that are suitable for safety, as well as autonomous or semi-autonomous control.

This Summary introduces simplified concepts related to indirectly verifying speed limits based on contextual information for autonomous and semi-autonomous driving systems, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a multispectral object-detection system with thermal imaging are described in this document with reference to the following figures:

FIG. 7-1 and FIG. 7-2 illustrate an example method to enable a multispectral object-detection system with thermal imaging.

The same numbers are often used throughout the drawings to reference like features and components.

DETAILED DESCRIPTION

Overview

Figure 1:
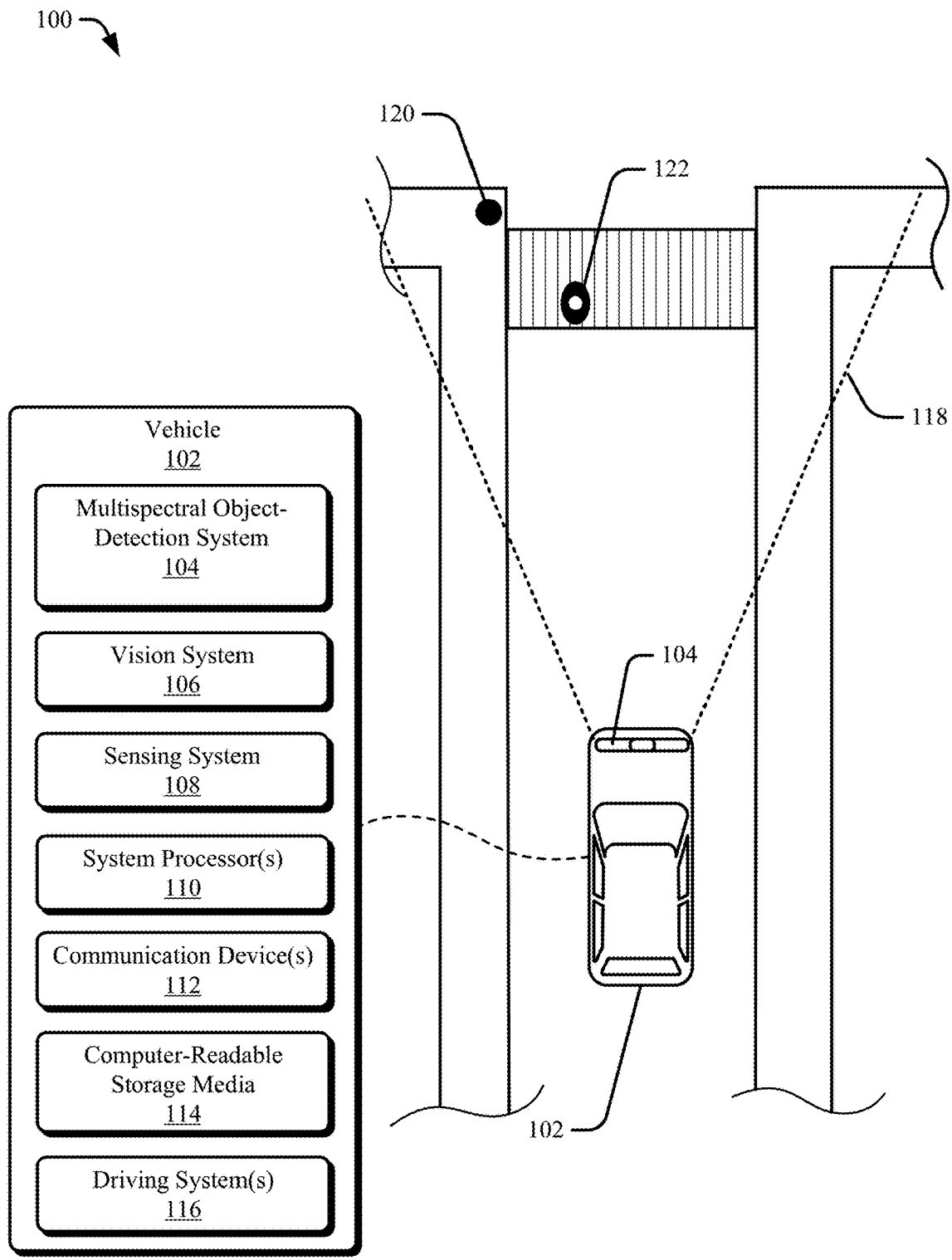
FIG. 1 illustrates an example environment in which a multispectral object-detection system with thermal imaging can be implemented for a vehicle.

Autonomous and semi-autonomous vehicles (AV) use sensor systems to detect objects in the environment around the AV. These systems can include various combinations of sensors, such as radar, cameras (e.g., a visible light camera), or a light detection and ranging system (a LIDAR system), to identify and locate objects that may present a risk of collision, such as pedestrians, vehicles, and other objects in or near the path of the AV. The data from the sensors and LIDAR may be merged and correlated with other data (e.g., from a navigation or location system) to identify objects and estimate their location, size, shape, and velocity.

Camera systems that use visible light are often susceptible to false-positive indications and noise. These "vision-based" cameras detect any object in the two-dimensional imagery of each camera, and it can be difficult to determine objects that are truly obstacles to avoid. Shadows and retro-reflections also introduce noise into the data, which increases ambiguity in discriminating real obstacles from false positives. Further, while LIDAR systems can be effective, they include laser light sources, higher-sensitivity sensors, and fast-response sensor capabilities, which can increase the costs associated with a LIDAR device. Additionally, there is typically a significant data-processing requirement to detect and track objects using a LIDAR system or visible-light cameras, which can cause heating issues, use more memory space, consume more processor resources, and increase cost.

In contrast, the described techniques and systems can be used to enable multispectral object-detection with thermal imaging, which can provide reliable and fast object detection and ranging calculations, while reducing or not increasing data processing and memory consumption. Consider an example in which an AV is operating on a road with pedestrian access. In this example, the road is lined with trees and streetlights, and a distracted jogger some distance ahead of the vehicle is about to step into the road in the AV's path. As the AV drives along the street, it scans the area around the AV for navigation and collision-avoidance purposes using a sensor system that includes an example multispectral object-detection system with thermal imaging. Assume in this example that the object-detection system includes at least an active near-infrared (NIR) range-finder, a thermal sensor, and an active NIR camera. The range-finder scans the environment around the AV and can detect objects on or near the road (e.g., the jogger or a tree). The thermal sensor detects thermal emissions from the jogger and from the background around the jogger (e.g., stationary objects such as buildings, the trees, and the streetlights). Based on thermal data determined from the detected thermal emissions, the thermal sensor can verify that the object detected by the range-finder is the jogger, and the object-detection system can communicate with the AV's navigation and collision-avoidance systems to control the AV to take evasive action or stop to avoid the jogger.

In another example, the range-finder detects another object on the side of the road. Assume this time that the object is a ladder on the side of the road that was left after some landscaping work on a tree. The thermal sensor and the NIR camera can act as a stereo camera system and collect image data that includes the object (the active NIR range-finder can also serve as an illumination source for the active NIR camera). Using pattern-matching techniques and stereoscopic image-processing, the perception system determines the object's distance from the AV, that the object is not a pedestrian, and that the object is not about to enter the AV's path. The object-detection system can communicate with the AV's navigation and collision-avoidance systems to control the AV, this time perhaps to reduce speed, but without unnecessary evasive maneuvers that might otherwise be performed if the ladder were considered as a pedestrian or other object to take extra caution to avoid. In this manner, the described systems and techniques for a multispectral object-detection system with thermal imaging can perform accurate object-detection and ranging to provide a safe and comfortable ride for the subject AV and its occupants, while reducing processor and memory usage, which can reduce costs and increase the efficiency and sustainability of the AV. A perception system that performs multispectral object detection with thermal imaging may be less expensive than other perception systems, which allows consumers to choose across a range of luxury and economical vehicle classes, without having to choose between driving safety and cost.

These examples are just a few examples of the described techniques and systems to enable the multispectral object-detection system with thermal imaging. This document describes other examples and implementations.

Systems and Apparatuses

FIG. 1 illustrates an example environment 100 in which a vehicle 102 (which can include an autonomous vehicle (AV), a semi-autonomous vehicle, or a manually operated vehicle that includes automated safety or warning features) can implement a multispectral object-detection system 104 with thermal imaging (also referred to as an object-detection system 104). The environment 100 can include roads, shoulders, sidewalks, parking lots or structures, or airspace (e.g., for aerial vehicles). Although illustrated as a car, the AV 102 can represent other types of vehicles (e.g., a motorcycle, a bus, a tractor, a semi-trailer truck, or construction equipment). The AV 102 may also be an aerial vehicle (e.g., a drone, a helicopter, or an airplane). In general, the object-detection system 104 can be used in any moving platform that can travel on or near the roads or in the airspace of the environment 100.

The AV 102 may include a vision system 106 that is mounted on the AV 102. The vision system 106 can take video and/or photographic images or video of the environment 100 around the AV 102, including roads and airspace. In some implementations, the vision system 106 can be mounted on or near the front of the AV 102. In other implementations, at least part of the vision system 106 can be mounted into a rear-view mirror of the AV 102 to have a FOV of the environment 100. In other implementations, the vision system 106 can project the FOV from any exterior surface of the AV 102. For example, at least a part of the vision system 106 can be integrated into a side mirror, bumper, roof, or any other interior or exterior location where the FOV includes the environment 100 (e.g., roads and/or airspace) around the AV 102. In general, the vision system 106 can be positioned to provide an instrument FOV that sufficiently encompasses the environment 100 around the AV 102.

The AV 102 can also include a sensing system 108 that can provide input data to one or more system processors 110. The system processor 110 can be a microprocessor or a system-on-chip of a computing device. The input data from the sensing system 108 can be used to detect objects in the environment 100 around the AV 102. For example, the input data of the sensing system 108 can be used to detect pedestrians, animals, other vehicles, debris, buildings, wires, traffic signals, signs, or other structures. The sensing system 108 can include a radar system, a positioning system (e.g., a radio-navigation-satellite system (RNSS) such as the global positioning system (GPS) in the United States or the Galileo system available in Europe), a lidar system, a radar system, an inertial measurement unit (IMU), such as a micro-electro-mechanical system (MEMS) IMU, or any combination thereof A radar system or a lidar system can use electromagnetic signals to detect objects in the environment 100 around the AV 102. A positioning system can determine a position of the AV 102 by receiving signals obtained by the positioning system as the AV 102 is traveling in the environment 100. An IMU can generate data that can be used to, for example, calculate three-dimensional position, angular rates, linear velocity, and position relative to a global coordinate system. The data generated by the IMU can also be used to predict future position, direction, velocity, and other parameters of the AV.

Operatively coupled to the system processors 110, the AV 102 also includes one or more communication devices 112 and one or more computer-readable storage media (CRM) 114. The communication devices 112 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 112 can be used to communicate with remote computing devices (e.g., a server or computing system providing navigation information or perception data), nearby structures (e.g., traffic signs or signals, pedestrian-operated devices, such as a mobile phone), or other vehicles.

For example, the AV 102 can use the communication devices 112 to wirelessly exchange information with nearby vehicles or other devices using vehicle-to-vehicle (V2V) or vehicle-to-everything (V2X) communication. The AV 102 can use V2V or V2X communication to obtain the speed, location, and heading of nearby vehicles. Similarly, the AV 102 can use the communication devices 112 to wirelessly receive information from other nearby devices to detect objects and pedestrians in the environment 100. The communication devices 112 can include a sensor interface and a driving system interface. The sensor interface and the driving system interface can transmit data over a communication bus of the AV 102, for example, when the individual components of the multispectral object-detection system 104 are integrated within the AV 102.

The CRM 114 can provide the AV 102 with persistent and nonpersistent storage of executable instructions (e.g., firmware, recovery firmware, software, applications, modules, programs, functions) and data (e.g., user data, operational data) to support the execution of the executable instructions. For example, the CRM 114 can include instructions that, when executed by the system processor 110, execute the multispectral object-detection system 104. Examples of the CRM 114 include volatile memory and non-volatile memory, fixed and removable media devices, and any suitable memory device or electronic data storage that maintains executable instructions and supporting data. The CRM 114 can include various implementations of random-access memory (RAM), static RAM (SRAM), dynamic RAM (DRAM), non-volatile RAM (NVRAM), read-only memory (ROM), flash memory, and other storage memory types in various memory device configurations. The CRM 114 excludes propagating signals. The CRM 114 can be a solid-state drive (SSD) or a hard disk drive (HDD).

The system processor 110 executes computer-executable instructions that may be stored within the CRM 114. As an example, the system processor 110 can execute the multispectral object-detection system 104. While shown in FIG. 1 as separate from the CRM 114, the multispectral object-detection system 104 can be stored on, and/or executed from, the CRM 114.

The system processor 110 can receive data from the multispectral object-detection system 104. As an example, the system processor 110 can receive image data or other data (e.g., thermal data or range-finding data) from the multispectral object-detection system 104, vision system 106, or the sensing system 108. Similarly, the system processor 110 can send configuration data or requests to the multispectral object-detection system 104, the vision system 106, or the sensing system 108. The system processor 110 can also execute the multispectral object-detection system 104 to perceive objects in the environment 100 and provide data as an input to one or more driving systems 116.

The multispectral object-detection system 104 can enable the AV to detect objects in a FOV 118 of the object-detection system 104 and avoid the detected objects if necessary. For example, the multispectral object-detection system 104 can enable the AV 102 to detect a streetlight 120 that is on a sidewalk and a pedestrian 122, who may be in or near a path of the AV. In this way, the AV 102 can control its operational parameters (e.g., velocity and/or direction), based on input from the object-detection system 104, to avoid the pedestrian. The operation and functionality of the multispectral object-detection system 104 are described below in greater detail with respect to the additional drawings.

The driving systems 116 can use data from the object-detection system 104, the vision system 106, and/or the sensing system 108 to control the AV 102. The driving systems 116 can include either or both autonomous or semi-autonomous driving subsystems that rely in part on data from the multispectral object-detection system 104 to control the operation of the AV 102 (e.g., detect objects that are in a driving path of the AV 102). Controlling the operation of the AV 102 can include controlling the AV 102 by way of direction (e.g., steering, forward, reverse), speed (e.g., accelerating, braking, shifting gears), and other driving functions, such as, flashing lights, enabling a horn, enabling hazard or turn signals, or otherwise safely driving the AV 102.

For example, the semi-autonomous driving system can provide an alert, based on data from the multispectral object-detection system 104, that a pedestrian (e.g., the pedestrian 122) exists and is approaching an intersection that the AV 102 is about to enter. Similarly, the autonomous driving system can navigate the AV 102 to a particular destination while avoiding pedestrians, vehicles, and other objects that may be in the driving path of the AV 102. For example, the driving systems 116 can provide braking and/or a speed reduction based on an indication from the object-detection system 104 that the pedestrian 122 has entered a crosswalk in the path of the AV 102, even though the AV may have a green light (e.g., the crossing signal is malfunctioning or the pedestrian 122 is distracted and entered the crosswalk while the crossing signal is red). In this way, the driving systems 116 can use information provided by the multispectral object-detection system 104 (and other sources) to enable the AV 102 to safely navigate the environment 100. By determining multispectral-based object-detections in the environment 100, the multispectral object-detection system 104 may enable the AV 102 to drive in the environment 100 as safely as other vehicles that are equipped with lidar or other luxury sensor packages that may be much more expensive and complex to implement, than using multispectral object-detection with thermal imaging, in accordance with the described techniques.

Figure 2:
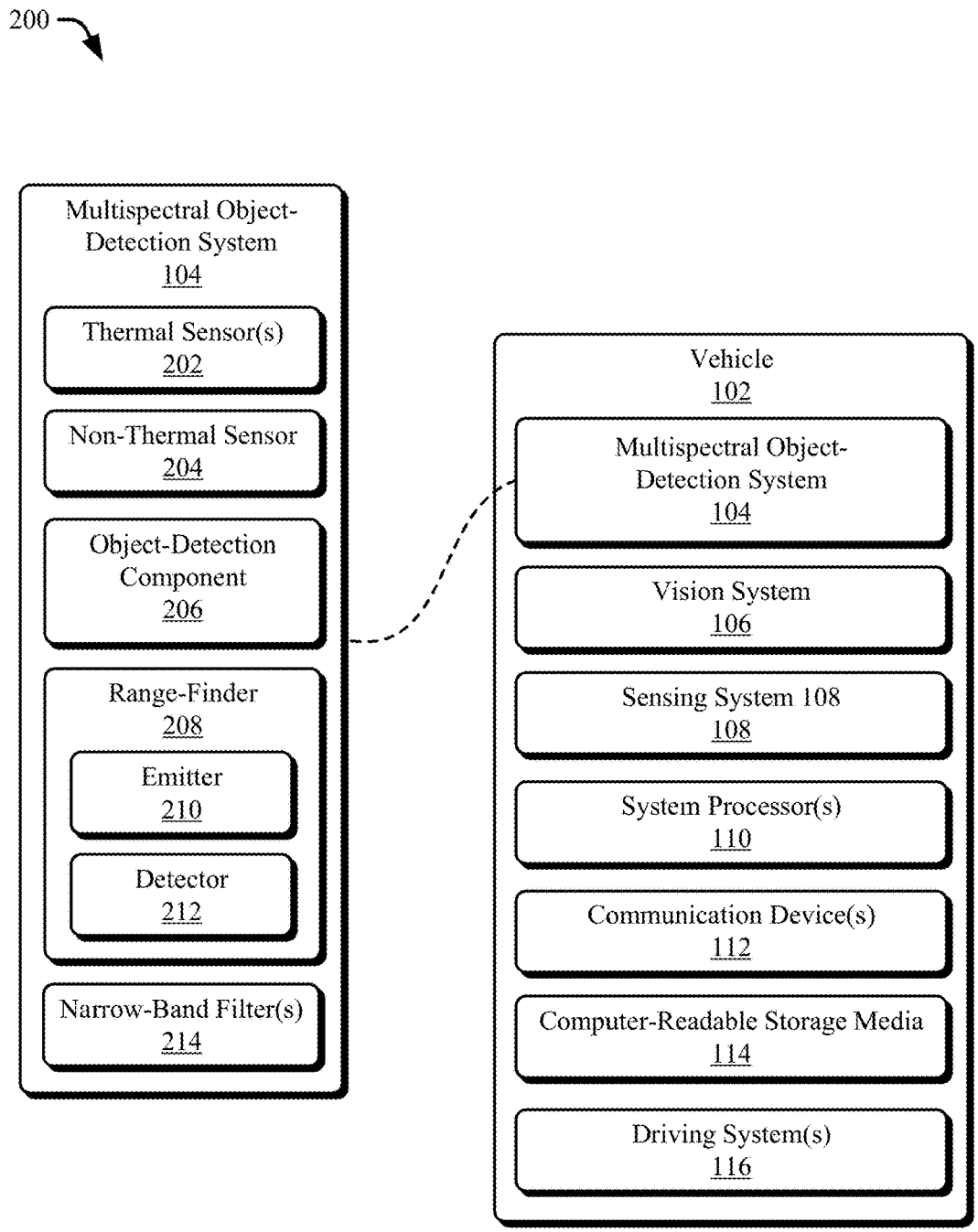
FIG. 2 illustrates an example configuration of a system that can enable the multispectral object-detection system with thermal imaging for the vehicle.

FIG. 2 illustrates an example configuration 200 of a system that can enable the multispectral object-detection system 104 with thermal imaging for the AV 102. As described with respect to FIG. 1, the AV 102 can include the object-detection system 104, the vision system 106, the sensing system 108, the system processor 110, the communication devices 112, the CRM 114, and the driving system 116.

The object-detection system 104 includes, or is associated with, a thermal sensor 202, a non-thermal sensor 204, and an object-detection component 206. In this example, CRM 114 stores instructions for implementing the object detection component 206, however, the object detection component 206 can be a standalone hardware component (e.g., an object detection processor) or a mixture of hardware, software, and/or firmware configured to execute the functions of the object detection component 206, described herein.

The object detection component 206 includes an interface to the thermal sensor 202, which can be any of a variety of sensors that can detect thermal radiation emitted from objects and an environment around those objects and provide thermal data based on the detected thermal radiation. An interface to the non-thermal sensor 204 is included in the object detection component 206; the non-thermal sensor 204 can be any of a number of sensors that can be used for detecting non-thermal radiation associated with objects around the sensor and providing non-thermal data based on the detected non-thermal radiation. For example, the non-thermal sensor 204 can be an imaging system or a camera system (e.g., a stereo camera system) that can operate using different illumination technologies (e.g., near-infrared radiation (NIR) cameras, visible-light cameras, or both visible-light and NIR cameras). In some cases, either or both the thermal sensor 202 or the non-thermal sensor 204 may detect thermal radiation or non-thermal radiation, respectively, over a time period and provide respective data over the time period. Additionally, the object-detection component 206 may, in some implementations, include an interface to multiple thermal sensors 202, and multiple non-thermal sensors 204.

In some implementations, the object-detection system 104 also includes one or more range-finders 208 that interface to the object-detection component 206. The range finders 208 can utilize any of a variety of range-finding technology.

The range-finders 208 can include an emitter 210 that can emit electromagnetic (EM) radiation and a detector 212 that can detect a portion of the EM radiation that is reflected from the object and provide range data based on the detected EM radiation. For example, the range-finder 208 can be an active NIR range-finder, in which the emitter 210 can emit NIR radiation, and the detector 212 can detect a portion of the NIR radiation that is reflected from objects in the FOV of the range-finder 208 over a period of time. The range-finder 208 can provide dynamic range data based on the detected portion of the NIR radiation reflected from the objects over the time period. The range-finder 208 can thus detect objects, or potential objects, in its FOV.

The emitter 210 may also serve as an illumination source for the non-thermal sensor 204. For example, range-finder 208 can be an active NIR range-finder, and the non-thermal sensor 204 can be an active NIR camera (or active NIR stereo camera system) that includes narrow-band filters 214 (e.g., narrow-band filters that allow NIR radiation to pass through). A portion of the NIR radiation emitted by the active NIR range-finder reflects off objects in the FOV of the range-finder back toward the object-detection system 104. The narrow-band filters 214 allow the reflected NIR radiation to pass through to the active NIR camera, which can provide the non-thermal data (e.g., NIR data or NIR image data).

Because the narrow-band filter 214 allows little other radiation (e.g., visible light) to pass through, when configured as an NIR camera, the non-thermal sensor 204 can provide information regarding objects within the FOV with reduced ambiguity. For example, as an active NIR camera, the non-thermal sensor 204 does not have to process as much information regarding other visible features that might otherwise be included in an image based on a broader spectrum (e.g., including visible light), such as shadows or background objects. In this way, the object-detection system 104 can have reduced image-processing requirements compared to some typical stereoscopic camera systems, which can improve object-detection accuracy without overburdening vehicle computing resources.

Generally, the object-detection component 206 can detect the object in the FOV of the thermal sensor and the other sensor (e.g., the FOV 118) based on one or more of the thermal data, the non-thermal data, or the range data. Additionally, the object-detection component 206 can determine a distance between the other sensor and the object based on one or more of the thermal data, the non-thermal data, or the range data.

Figure 3:
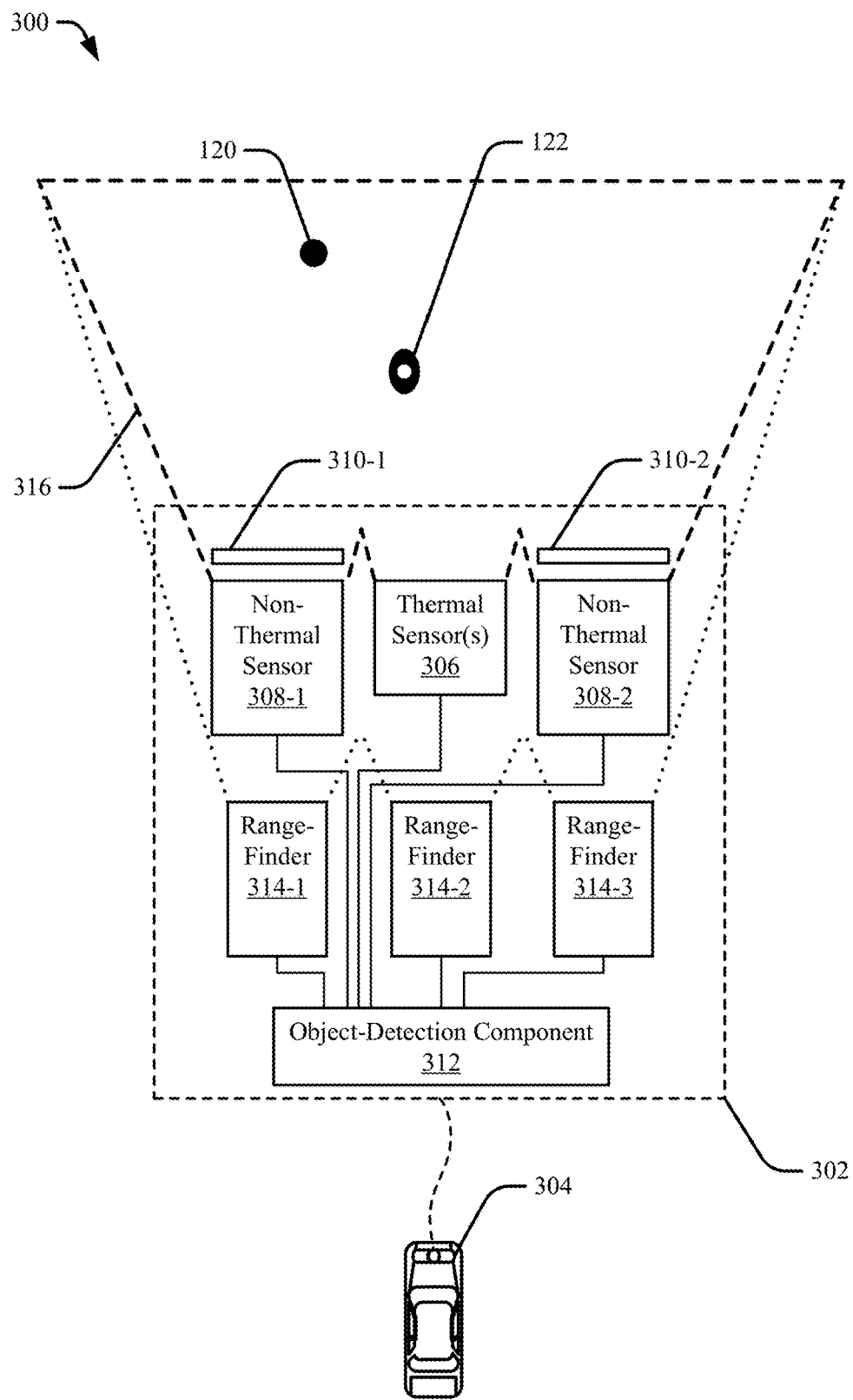
FIG. 3 illustrates a schematic of an example object-detection system that can be implemented in an autonomous vehicle (AV), such as the vehicles of FIGS. 1 and 2.

FIG. 3 illustrates, generally at 300, a schematic of an example object-detection system 302 that can be implemented in an example AV 304. The example object-detection system 302 includes one thermal sensor 306 and two non-thermal sensors 308-1 and 308-2, which include (or are associated with) narrow-band filters 310-1 and 310-2, respectively. The example object-detection system 302 also includes one object-detection component 312 and three range-finders 314-1, 314-2, and 314-3. The various components of the example object-detection system 302 combine to enable a FOV 316, which represents an area from which the example object-detection system 302 can receive reflected radiation to detect objects (e.g., the streetlight 120 or the pedestrian 122). For example, the range-finders 314-1, 314-2, and 314-3 can be NIR range-finders. The non-thermal sensors 308-1 and 308-2 can be NIR cameras, visible-light cameras, or one NIR camera and one visible-light camera. In implementations with at least one NIR camera, the range-finders 314-1, 314-2, and 314-3 can serve as illumination for the NIR camera(s).

Returning to FIG. 2, the object-detection component 206 can receive data over time (e.g., thermal data from the thermal sensor 202, non-thermal data from the non-thermal sensor 204, or other data from another sensor) and, based on the data, detect the objects in the FOV. For example, based on one or both of thermal data or non-thermal data, the object-detection component 206 can detect an object in the FOV 118 of the object-detection system 104 and discriminate between the background and the object to determine whether the detected object is an object in the driving path of the AV 102 that should be avoided. The object-detection component 206 can also communicate with the AV 102 to enable the AV 102 to avoid the detected objects (e.g., communicate with a navigation or driving system, as described herein). As shown in FIG. 2 (and FIG. 1), the object-detection component 206 is integrated with the AV 102. In other implementations, the object-detection component 206 can execute remote from the AV 102, and execute at least partially on a remote processor (e.g., cloud- or server-based), or another processor of another AV.

The thermal data received over time can be sequential differential temperature data that indicates a difference between an amount of thermal radiation emitted from the object and an amount of thermal radiation emitted from the background around the object over a time period. The object-detection component 206 can determine a temperature gradient between the object and the background, over the time period, based on at least the sequential differential temperature data. The temperature gradient may therefore be considered a gradient across an edge of the object. Further, the object-detection component 206 can detect the object in the FOV of the thermal sensor 202 and the non-thermal sensor 204 (e.g., the FOV 118), based on at least the dynamic NIR range data and the temperature gradient. For example, based on the dynamic NIR range data, the object-detection component 206 may determine a distance of an object (or a potential object) from the AV 102. Using thermal data from the thermal sensor 202, the object-detection component 206 can use the temperature gradient to detect an object in the FOV 118 or verify that the potential object (e.g., detected by the rang-finder 208) is an actual object that should be avoided by the AV 102.

In some implementations, the temperature gradient may be determined using at least the dynamic NIR range data and the temperature gradient by determining an average rate of change of an amount of thermal radiation emitted from the object, and from the background around the object, over the time period. The average rates of change of the amounts of thermal radiation emitted from the object and from the background around the object over the time period can then be compared. The object-detection component 206 can verify that the object exists (and is a type of object that should be avoided), based on the comparison indicating that the average rate of change of the amount of thermal radiation emitted from the object over the time period has decreased, relative to the average rate of change of the amount of thermal radiation emitted from the background.

In some cases, the object-detection component 206 can determine the temperature gradient when a difference between a temperature of the object and a temperature of the background around the object is a few degrees or a fraction of a degree Celsius. For example, the temperature difference may be between approximately 0.25 degrees Celsius and approximately 6 degrees Celsius.

Figure 4:
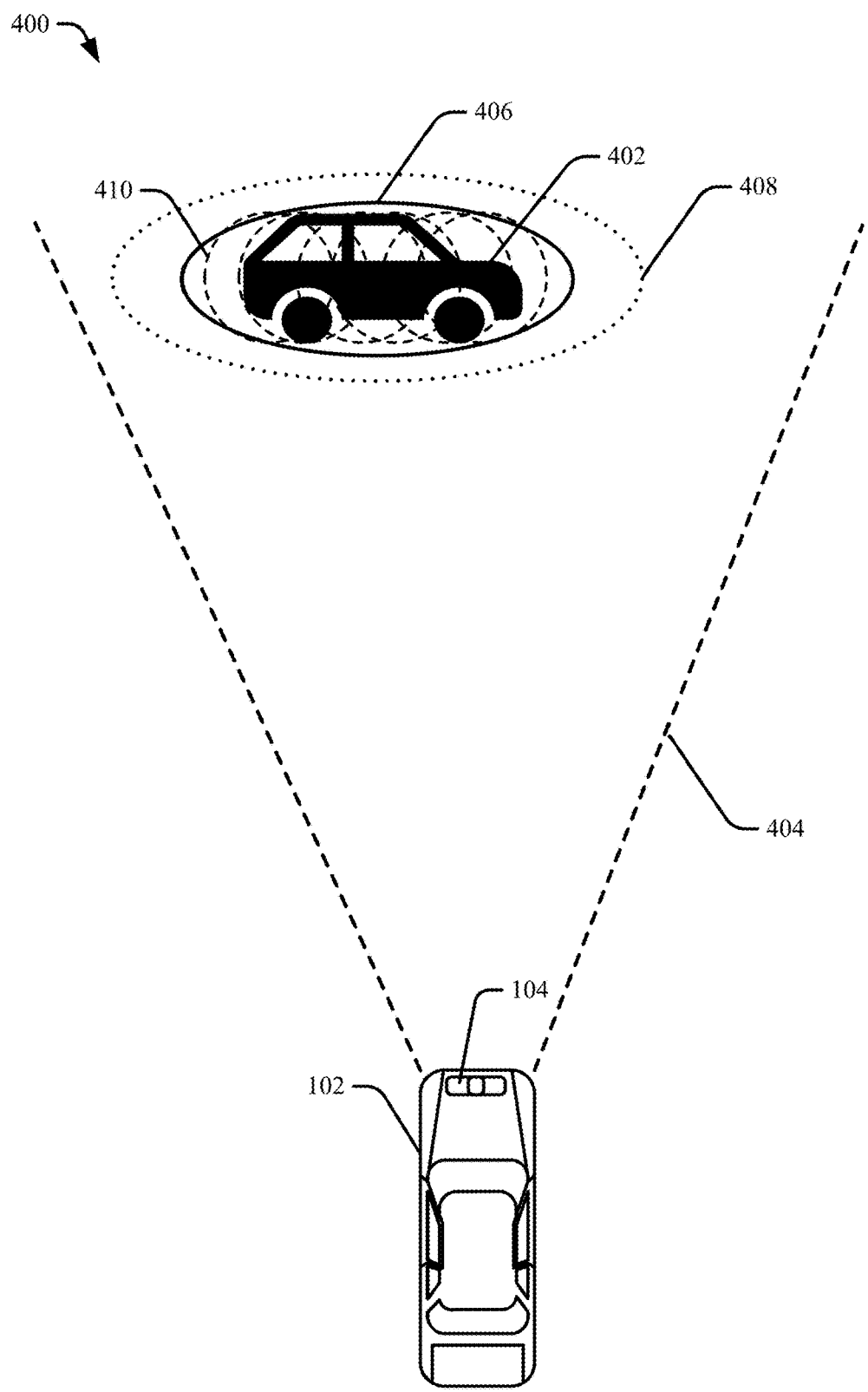
FIG. 4 illustrates an example object-detection scenario using the object-detection system of FIG. 1, 2, or 3.

Consider FIG. 4, which illustrates an example object-detection scenario 400 using the object-detection system 104. In the example scenario 400, a vehicle 402 is in a FOV 404 of the object-detection system 104. When there is relative motion between the AV 102 and the vehicle 402 (e.g., the AV 102 moving toward the vehicle 402 or the vehicle 402 is moving across the FOV 404), thermal radiation emitted from different parts of the vehicle 402 will be sensed over time, depending on a spot size 406 of the thermal sensor 202. If the spot size 406 is relatively larger than the vehicle 402 (e.g., as shown by a dotted-line spot 408), the determination of the average rate of change of the amount of thermal radiation emitted from the object over the time period will include a relatively large component of thermal radiation emitted from the background. However, when the spot size 406 is properly calibrated (as shown), the thermal sensor 202 detects more thermal radiation from the vehicle 402. An effective spot size depends on several factors, including a sample rate and resolution of the thermal sensor 202, as well as a relative speed of the object.

Furthermore, as the sensor detection area (e.g., the spot size 406) moves across the object, thermal radiation from the background is detected when the sensor detection area moves across edges of the vehicle 402. In this way, the thermal sensor 202 can act as an edge detector. For example, the thermal sensor 202 detects all or mostly background thermal radiation until it detects the vehicle 402. Then the thermal sensor 202 detects thermal radiation from the vehicle 402 and from the background and then mostly thermal radiation from the vehicle 402, which can define an edge of the vehicle 402. Combined with the dynamic range data from the range-finder 208, which can be used to scan the FOV 404 for potential objects, the average rate of change of the amount of thermal radiation emitted from the background and the vehicle 402 can provide a robust object-detection algorithm.

Accordingly, as a signal of the thermal sensor 202 (e.g., a signal based on the detected thermal energy from the vehicle 402) sequentially integrates on the vehicle 402, as shown by the multiple dashed-line circles 410, the reflection component decreases. The rate of change of the thermal signal also stabilizes, compared with a no-object condition. For example, when there is an object and the thermal sensor 202 detects thermal radiation emitted from the object, the rate of change of the amount of thermal radiation stabilizes because the amount of thermal radiation being emitted from the object changes less than that of the background, which may contain multiple objects emitting different amounts of thermal radiation. The stability of the rate of change signal thus indicates that an object (with vertical attributes) is present, such as the vehicle 402. Using the moving average of the sequential rate-of-change signal, along with low-pass filtering, will minimize object false-alarms (e.g., indications of an object when there is not actually an object). The ratio of the rate of change (or derivative) of both the thermal signal and signals from the non-thermal sensor 204 (e.g., NIR signals, visible-light signals, and so forth) can create additional algorithm robustness.

Figure 5:
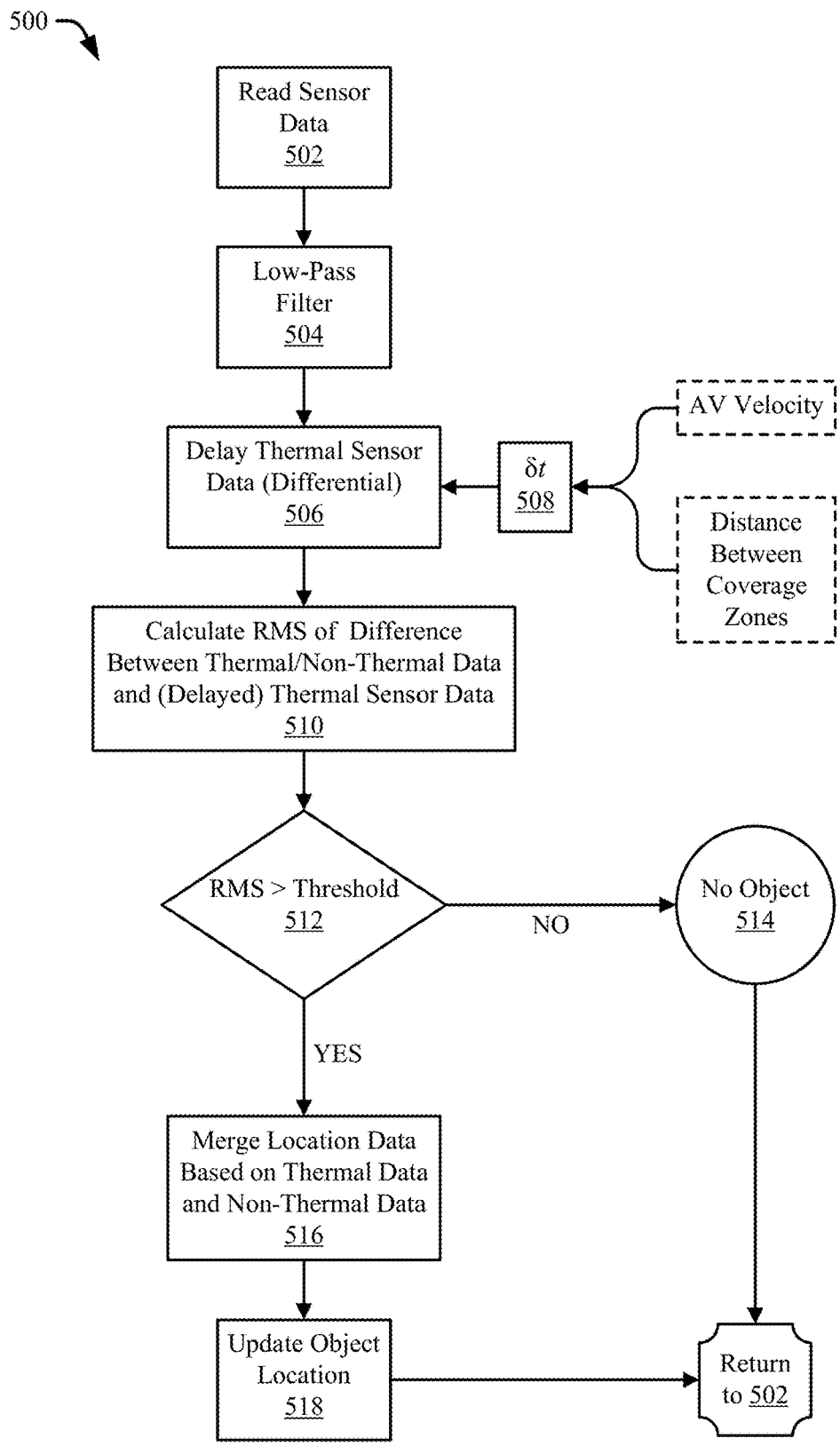
FIG. 5 is a flow diagram that illustrates an example process for using a differential time delay and temperature gradient to detect an object with the object-detection system of FIG. 1, 2, or 3.

In some implementations, a differential time delay can be used to compare the sequential data from the thermal sensor 202. Consider FIG. 5, which is a flow diagram that illustrates an example process 500 for using a differential time delay and temperature gradient to detect an object with the object-detection system 104.

In the example process 500, rather than using the thermal sensor 202 only for thermal imaging, the described techniques use a differential temperature difference between sequential (time-based) thermal measurements of a potential object, compared with similar sequential measurements of background thermal radiation to aid in object detection. For this example, assume each chronological thermal measurement can be considered a thermal "snapshot," then there is a thermal difference at each pixel next to each other as the measurements are taken snapshot-to-snapshot. The differences between pixels at the next snapshot describe a differential from the previous snapshot and thus a temperature gradient. By calculating a root-mean-square (RMS) of the gradient, the object and its potential movement relative to the background reference can be determined.

At 502, the object-detection component 206 reads thermal data from the thermal sensor 202 and non-thermal data from the non-thermal sensors 204 (e.g., one or more non-thermal sensors, such as an NIR sensor or visible-light sensor). At 504, a low-pass filter is applied to the data. At 506, a time delay is applied to the thermal data. The time delay is based on a differential calculation at 508 that is based on a velocity of the AV 102 and a distance between the coverage zones of the thermal sensor 202 and the non-thermal sensor(s) 204. At 510, the object-detection component 206 calculates the RMS of the differences between snapshots based on the thermal data and the same snapshot based on the non-thermal data (e.g., visible-light data and/or NIR data). The RMS value is compared to a threshold value at 512. The RMS threshold can be based on a differential temperature across a time interval. For example, 0.1 degree per second. Thus, a sample might be initially detected as a 0.01 degree differential over a time interval of 100 milliseconds. This threshold can be compared over several time periods to confirm consistency of an object's velocity or relative distance compared to the background. If this threshold is maintained over several time periods and positions (e.g., 0.1 degree over 1 seconds and 1 degree over 10 seconds), then the RMS differential temperature threshold can be consistently maintained and indicative of the presence of an object compared to its immediate or relative background.

At 514, if the RMS value does not exceed the threshold, the object-detection component 206 determines that no object is present, and the process returns to operation 502. At 516, if the RMS value exceeds the threshold, the object-detection component 206 merges the location prediction for the object based on the thermal data with the location prediction for the object based on the non-thermal data (e.g., using a sensor fusion technique). The object-detection component 206 updates the object location at 518 (e.g., by providing the merged location data to the driving system 116), and the process returns to operation 502.

In this case, smaller differences between the background thermal measurements and the thermal measurements for the object are highlighted in differential measurements, which provides robust detection capabilities, compared to techniques that use only thermal imaging, even when a temperature difference between the object and the background is relatively small. In other implementations, the object-detection system 104 can use other techniques to detect objects. For example, the object-detection component 206 can use image data from one or both of the thermal sensor 202 and the non-thermal sensor 204 to detect objects.

Figure 6:
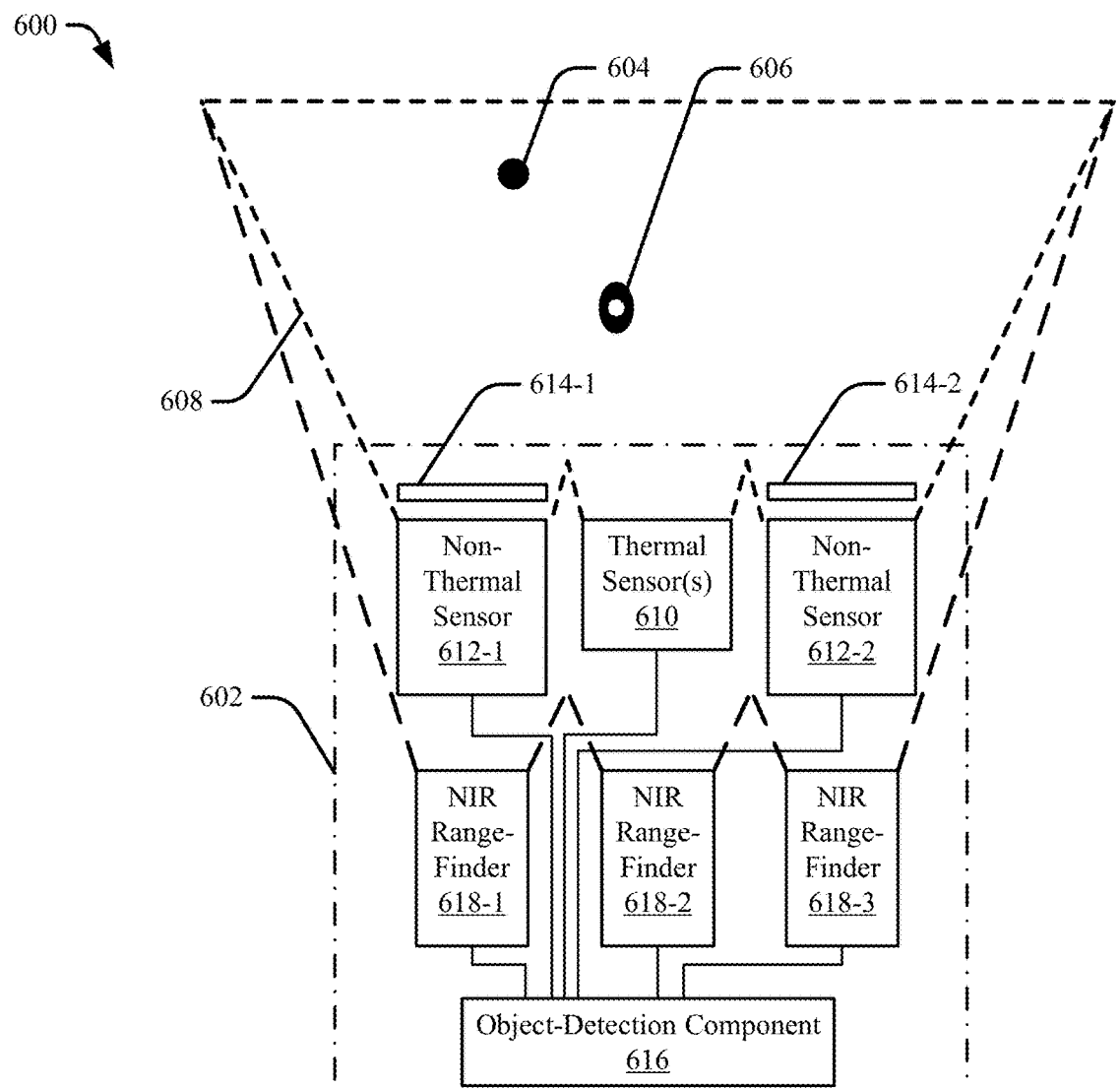
FIG. 6 illustrates another example object-detection scenario using the object-detection system of FIG. 1, 2, or 3.
Figure 6:
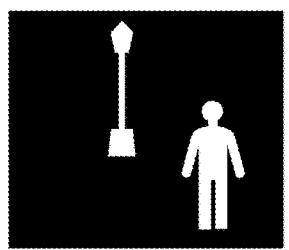
Figure 6:
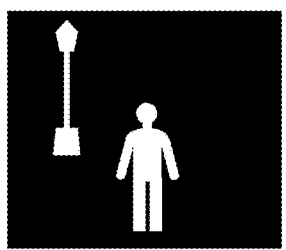

Consider FIG. 6, which illustrates another example object-detection scenario 600 using an example object-detection system 602. In the example scenario 600, two objects, a streetlight 604, and a pedestrian 606 are within a FOV 608 of the example object-detection system 602. The example object-detection system 602 includes a thermal sensor 610 and two active NIR cameras 612-1 and 612-2 (non-thermal sensors 612), which include narrow-band filters 614-1 and 614-2, respectively. The example object-detection system 602 also includes one object-detection component 616 and three active NIR range-finders 618-1, 618-2, and 618-3, which can be used as an illumination system for the NIR cameras 612-1 and 612-2, as described above (e.g., using the narrow-band filters 614-1 and 614-2 to filter radiation reflected from the streetlight 604 and the pedestrian 606). The various components of the example object-detection system 602 combine to enable the FOV 608, which represents an area from which the example object-detection system 602 can receive reflected radiation to detect objects (e.g., the streetlight 604 or the pedestrian 606). In other implementations, the example object-detection system 602 may include different numbers of any of the elements described or shown.

In the example scenario 600, the active NIR cameras 612-1 and 612-2 can detect a portion of the NIR radiation emitted from the active NIR range-finders 618-1, 618-2, and 618-3 and reflected from streetlight 604 and the pedestrian 606 (e.g., the non-thermal radiation associated with the streetlight 604 and the pedestrian 606). The active NIR cameras 612-1 and 612-2 provide non-thermal data, which can be NIR image data, based on the NIR radiation reflected from the streetlight 604 and the pedestrian 606. Similarly, the thermal data provided by the thermal sensor 610 can be thermal image data. The object-detection component 616 can determine an NIR image of the streetlight 604 and the pedestrian 606, based on the NIR image data and determine a thermal image of the streetlight 604 and the pedestrian 606, based on the thermal image data. Further, the object-detection component 616 can detect the streetlight 604 and the pedestrian 606 in the FOV 608, based on a pattern-matching technique and using the NIR image of the object and the thermal image of the object.

For example, consider the detail views 600-1 and 600-2, which depict an NIR image and a thermal image, respectively, of the streetlight 604 and the pedestrian 606. The object-detection component 616 can use pattern-matching techniques with one or both of the images to determine that one object is the streetlight 604 (which likely does not need to be avoided because it is not on the road) and the other object is the pedestrian 606. Further, because the pedestrian 606 appears to be in the driving path the AV 102, the object-detection component 616 can provide a location update or other information to the AV 102 (e.g., to the driving system 116) so that the AV 102 can safely navigate.

Returning to FIG. 2, in some implementations, the object-detection system 104 (or 302 or 602) can also be used to determine a distance of detected objects from the object-detection system 104 as well as a size and/or relative motion of the detected objects.

For example, in an implementation of the object-detection system 104 in which the range-finder 208 is an active NIR range-finder, the emitter 210 can emit NIR radiation, and the detector 212 can detect a portion of the NIR radiation reflected from objects over a time period. The (active NIR) range-finder 208 can provide dynamic NIR range data based on the detected portion of the NIR radiation reflected from the object. Further, the emitter 210 can act as an illumination system for the non-thermal sensor 204, and the non-thermal radiation associated with the object can be a portion of the NIR radiation emitted from the range-finder 208 that is reflected from the object. The non-thermal sensor 204 can be one or more active NIR cameras that can provide the non-thermal data based on the NIR radiation reflected from the object. In this example, the non-thermal data can be NIR image data, and the thermal data can be thermal image data.

The object-detection component 206 can determine a distance between the NIR cameras (or the object-detection system 104) and the object based on a stereoscopic image-processing technique. For example, the object-detection component 206 can use corresponding time-aligned images that are extracted from the thermal image data and the NIR image data. Consider the detail views 600-1 and 600-2 of FIG. 6, which illustrate an NIR image and a thermal image, respectively, of the streetlight 604 and the pedestrian 606. Because the distance between the thermal sensor 612-1 and the non-thermal sensor 610 is known and the two images are taken from different angles (shown by the different positions of the streetlight 604 and the pedestrian 606 in the detail views), the object-detection processor can use stereoscopic image-processing techniques on the images to determine the distance between the NIR cameras and the streetlight 604 and the pedestrian 606.

In some cases, because the NIR cameras can be configured with a relatively wider/longer baseline (compared with some typical stereo camera systems), the NIR cameras may be capable of longer-distance ranging. The NIR camera pair can therefore also or instead be used to verify or refine the distance measurements made by the thermal sensor 202.

In some implementations, the object-detection component 206 can also determine the distance based on the dynamic NIR range data provided by the range-finder 208 using, for example, a time-of-flight technique. In other implementations, the object-detection component 206 can also determine the distance based on both the image data (using, e.g., the stereoscopic image-processing techniques) and the dynamic range data (using, e.g., the time-of-flight technique).

Additionally or alternatively, the object-detection component 206 (or another processor) can use range data provided by the range-finder 208 (e.g., the dynamic NIR range data) to perform real-time calibration to the active NIR stereo camera system (e.g., the non-thermal sensor 204) to account for minor misalignments of the NIR cameras over time. For example, the object-detection component 206 can compare the distance determined using the range data to the distance determined using the image data and adjust or calibrate a camera parameter, if necessary.

Further, the object-detection system 104 (e.g., the example implementation of the object-detection system 104 described above in which the range-finder 208 is an active NIR range-finder and the non-thermal sensor is one or more active NIR cameras) can be used to determine a size and motion of objects in the FOV of the object-detection system 104. In some implementations, the object-detection component 206 can use one or more physical properties of the object-detection system 104, along with data from the range-finder 208 and the NIR cameras to determine the size of detected objects (e.g., a pedestrian or other vehicle). For example, size and motion of the objects can be determined using a geometrical configuration of the emitter 210 and the detector 212 of the active NIR range-finder 208, a relative target distance between the one or more active NIR cameras (e.g., the non-thermal sensors 204) and the object, an amount of frame-to-frame overlap between sequential images extracted from the NIR image data; and/or a refresh rate of the one or more active NIR cameras. The relative target distance based on the range data can be determined using the dynamic NIR range data.

In some implementations, the object-detection system 104 (e.g., the example implementation of the object-detection system 104 described above in which the range-finder 208 is an active NIR range-finder and the non-thermal sensor is one or more active NIR cameras) can also use the data from the range-finder 208 and the thermal sensor 202 to determine the motion of objects in the FOV of the object-detection system 104. As noted above (e.g., with reference to at least FIGS. 2-4), the object-detection component 206 can determine a temperature gradient across an edge of the object based on the thermal data from the thermal sensor 202. Based on the temperature gradient and the dynamic NIR range data, the object-detection component 206 can also determine the motion of the objects.

For example, stationary objects that have a heat difference with respect to the background environment tend to have a more-blurred edge compared to typical objects based on the amount of temperature difference and the absolute temperature. In contrast, when there is relative motion (e.g., the object is moving or the sensor is moving toward the object), objects tend to have sharper edges (e.g., temperature gradients). The range-finder 208 can detect so-called "potential targets" in the FOV, and using the temperature gradient allows the system to discriminate, at a much higher confidence value, that the object has vertical extent and is moving relative to the sensors, either getting closer, getting farther away, or moving across the FOV.

Example Methods

FIGS. 7-1 and 7-2 illustrate an example method 700 to enable a multispectral object-detection system with thermal imaging. The method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the example environment 100 of FIG. 1, and entities detailed in FIGS. 1 through 6, reference to which is made only for the purpose of example. The described techniques are not limited to performance by one entity or multiple entities. Further, throughout the description of the method 700, references to acts performed by the object-detection system 104 can include acts performed by the object-detection system 104, 302, or 602, including respective subcomponents of the object-detection systems 104, 302, or 602 (e.g., the thermal sensors 202, 306, or 610; the non-thermal sensors 204, 308, or 612; the object-detection components 206, 312, or 616; or the range-finders 208, 314, or 618). Further, references to acts performed by an example subcomponent (e.g., the thermal sensor 202) can include acts performed by another example of the subcomponent (e.g., the thermal sensor 610).

At 702, an object-detection processor of an object-detection system receives thermal data from a thermal sensor. The thermal data can be based on thermal radiation detected by the thermal sensor and emitted from an object in a FOV of the thermal sensor, from a background around the object, or from both the object and the background. For example, the object-detection component 206, 312, or 616 can receive thermal data from the thermal sensor 202, 306, or 610, based on radiation detected from an object (e.g., the streetlight 120 (or 604) or the pedestrian 122 (or 606)). The thermal data can be any of a variety of data types, including, for example, thermal image data or sequential differential temperature data. The sequential differential thermal data can indicate a change in thermal radiation emitted from the object and/or from the background around the object over a time period.

At 704, the object-detection processor receives non-thermal data from a non-thermal sensor. The non-thermal data can be based on non-thermal radiation associated with the object and detected by the non-thermal sensor. For example, the object-detection component 206, 312, or 616 can receive the non-thermal data from the non-thermal sensor 204, 308, or 612. The non-thermal data can be any of a variety of data types, including, for example, non-thermal image data (e.g., NIR image data or visible-light image).

At 706, the object-detection processor detects the object based on one or both of the thermal data or the non-thermal data. For example, the object-detection component 206, 312, or 616 can detect the object based on one or both of the thermal data from the thermal sensor 202, 306, or 610 or the non-thermal data from the non-thermal sensor 204, 308, or 612. In this example, detecting the object can refer to one or more operations that the object-detection sensor performs to determine that the received thermal and/or non-thermal data indicates that an object exists in the FOV of the sensors.

At 708, the object-detection processor determines a distance between the object-detection system and the object based on one or both of the thermal data or the non-thermal data. For example, the object-detection component 206, 312, or 616 can determine the distance between the object-detection system 104 and the object based on one or both of the thermal data from the thermal sensor 202, 306, or 610 or the non-thermal data from the non-thermal sensor 204, 308, or 612.

In some implementations, the non-thermal sensor can be one or more active NIR cameras that include, or are associated with, an emitter that can emit NIR radiation. The NIR cameras can provide NIR image data based on reflections of at least a portion of the NIR radiation that is reflected from the object and detected by the active NIR cameras. The object-detection component 206 can determine a thermal image of the object and an NIR image of the object, based on the thermal image data and the NIR image data, respectively. The object-detection component 206 can detect the object based on a pattern-matching technique using the NIR image of the object and the thermal image of the object.

The object-detection component 206 can also determine the distance between the active NIR cameras and the object based on a stereoscopic image-processing technique using corresponding time-aligned images extracted from the thermal data and from the NIR data, as described above (e.g., with reference to at least FIG. 2 and FIG. 6). In some implementations, the object-detection processor can receive dynamic range data from an active near-infrared (NIR) range-finder, as described above. The active NIR range-finder can include an emitter that can emit NIR radiation and a detector that can detect a portion of the NIR radiation that is reflected from the object over a time period. The active NIR range-finder can then provide the dynamic NIR range data based on the detected portion of the NIR radiation reflected from the object and determine the distance between the NIR cameras and the object based on a time-of-flight technique using the dynamic NIR range data. Additional optional operations of the method 700 are shown in FIG. 7-2 at operation "A" as shown in FIG. 7-1.

FIG. 7-2 illustrates additional optional operations of the method 700 at operation "A." At 710, the object-detection processor receives dynamic NIR range data from an active near-infrared (NIR) range-finder. The active NIR range-finder can include an emitter configured to emit NIR radiation. The active NIR range-finder can also include a detector configured to detect a portion of the NIR radiation reflected from the object over a time period and provide the dynamic NIR range data based on the detected portion of the NIR radiation reflected from the object. For example, the object-detection component 206, 312, or 616 can receive dynamic NIR range data from the range-finder 208, 314, or 618.

At 712, the object-detection processor receives the sequential differential temperature data (e.g., the thermal data) from the thermal sensor over the time period. For example, the object-detection component 206, 312, or 616 can receive the sequential differential temperature data from the thermal sensor 202, 306, or 610.

At 714, the object-detection processor determines a temperature gradient between the object and the background over the time period. The temperature gradient can be based on at least the sequential differential temperature data. For example, the object-detection component 206, 312, or 616 can determine the temperature gradient based on the sequential differential temperature data received from the thermal sensor 202, 306, or 610.

At 716, the object-detection processor verifies that the object exists based on at least the dynamic NIR range data and the temperature gradient. For example, the object-detection component 206, 312, or 616 can use the temperature gradient to verify that a potential object detected using the dynamic NIR range data is an actual object (e.g., that the AV 102 should avoid). In some implementations, determining the temperature gradient includes using the object-detection component 206, 312, or 616 to determine an average rate of change of an amount of thermal radiation emitted from the object over the time period and from the background around the object over the time period. The object-detection component 206, 312, or 616 then compares the average rates of change of the amounts of thermal radiation emitted from the object and from the background around the object over the time period. The object-detection component 206, 312, or 616 can then verify that the object exists, based on the comparison indicating that the average rate of change of the amount of thermal radiation emitted from the object over the time period has decreased relative to the average rate of change of the amount of thermal radiation emitted from the background.

EXAMPLES

In the following section, examples are provided.

Example 1

A system comprising: a thermal sensor configured to detect thermal radiation emitted from an object in a field-of-view (FOV) of the thermal sensor and from a background around the object and provide thermal data, based on the thermal radiation; a non-thermal sensor configured to detect non-thermal radiation associated with the object and provide non-thermal data, based on the non-thermal radiation; and a processor configured to: receive the thermal data and the non-thermal data; and detect the object, based on at least one of the thermal data or the non-thermal data.

Example 2

The system of example 1, wherein: the system further comprises an active near-infrared (NIR) range-finder, the active NIR range-finder comprising: an emitter configured to emit NIR radiation; and a detector configured to detect a portion of the NIR radiation reflected from the object over a time period and provide dynamic NIR range data based on the detected portion of the NIR radiation reflected from the object; the thermal sensor is further configured to provide the thermal data over the time period; the thermal data comprises sequential differential temperature data, the sequential differential temperature data indicating a difference between thermal radiation emitted from the object and from the background around the object over the time period; and the processor is further configured to: detect the object in the FOV, based on the dynamic NIR range data; determine a temperature gradient between the object and the background, over the time period, the temperature gradient based on at least the sequential differential temperature data; and verify that the object exists, based on at least the dynamic NIR range data and the temperature gradient.

Example 3

The system of any preceding example, wherein the processor is further configured to verify that the object exists, based on at least the dynamic NIR range data and the temperature gradient, by: detecting the object, based on the dynamic NIR data; determining the temperature gradient by: determining an average rate of change of an amount of thermal radiation emitted from the object over the time period; determining an average rate of change of an amount of thermal radiation emitted from the background around the object over the time period; and comparing the average rates of change of the amounts of thermal radiation emitted from the object and from the background around the object over the time period; and verifying that the object exists, based on a result of the comparing indicating that the average rate of change of the amount of thermal radiation emitted from the object over the time period has decreased, relative to the average rate of change of the amount of thermal radiation emitted from the background.

Example 4

The system of any preceding example, wherein a difference between a temperature of the object and a temperature of the background around the object is between approximately 0.25 degrees Celsius and approximately 6 degrees Celsius.

Example 5

The system of any preceding example, wherein: the system further comprises an active near-infrared (NIR) range-finder, the active NIR range-finder comprising: an emitter configured to emit NIR radiation; and the non-thermal radiation associated with the object comprises a portion of the NIR radiation emitted from the active NIR range-finder and reflected from the object; the non-thermal sensor comprises one or more active near-infrared (NIR) cameras, the one or more NIR cameras configured to provide the non-thermal data based on the NIR radiation reflected from the object; the non-thermal data comprises NIR image data; the thermal data comprises thermal image data; and the processor is further configured to: determine an NIR image of the object, based on the NIR image data; determine a thermal image of the object, based on the thermal image data; and detect the object in the FOV of the thermal sensor and the other sensor, based on a pattern-matching technique and using the NIR image of the object and the thermal image of the object.

Example 6

The system of any preceding example, wherein: the system further comprises an active NIR range-finder, the NIR range-finder including at least an emitter configured to emit NIR radiation; the non-thermal radiation associated with the object comprises a portion of the NIR radiation emitted from the active NIR range-finder and reflected from the object; the non-thermal sensor comprises one or more active NIR cameras, the one or more NIR cameras configured to provide the non-thermal data based on the NIR radiation reflected from the object; the non-thermal data comprises NIR image data; the thermal data comprises thermal image data; and the processor is further configured to determine a distance between the system and the object based on a stereoscopic image-processing technique using corresponding time-aligned images extracted from the thermal image data and the NIR image data.

Example 7

The system of any preceding example, wherein: the system further comprises an active NIR range-finder that includes: an emitter configured to emit NIR radiation; and a detector configured to detect a portion of the NIR radiation reflected from the object over a time period and provide dynamic NIR range data based on the detected portion of the NIR radiation reflected from the object; and the processor is further configured to determine a distance between the NIR range-finder and the object based on a time-of-flight technique using the dynamic NIR range data.

Example 8

The system of any preceding example, wherein: the system further comprises an active NIR range-finder that includes: an emitter configured to emit NIR radiation; and a detector configured to detect a portion of the NIR radiation reflected from the object over a time period and provide dynamic NIR range data based on the detected portion of the NIR radiation reflected from the object; the non-thermal radiation associated with the object comprises a portion of the NIR radiation emitted from the active NIR range-finder and reflected from the object; the other sensor comprises one or more active NIR cameras, the one or more NIR cameras configured to provide the non-thermal data based on the NIR radiation reflected from the object; the non-thermal data comprises NIR image data; the thermal data comprises thermal image data; and the processor is further configured to determine a distance between the system and the object based on: a stereoscopic image-processing technique using corresponding time-aligned images extracted from the thermal image data and the NIR image data; and a time-of-flight technique using the dynamic NIR range data.

Example 9

The system of any preceding example, wherein: the system further comprises an active NIR range-finder that includes: an emitter configured to emit NIR radiation; and a detector configured to detect a portion of the NIR radiation reflected from the object over a time period and provide dynamic NIR range data based on the detected portion of the NIR radiation reflected from the object; the non-thermal radiation associated with the object comprises a portion of the NIR radiation emitted from the active NIR range-finder and reflected from the object; the non-thermal sensor comprises one or more active NIR cameras, the one or more NIR cameras configured to provide the non-thermal data based on the NIR radiation reflected from the object; the non-thermal data comprises NIR image data; and the processor is further configured to determine a size of the object based on one or more of: a geometrical configuration of the emitter and detector of the active NIR range-finder; a relative target distance between the system and the object, the relative target distance based on the dynamic NIR range data; an amount of frame-to-frame overlap between sequential images extracted from the NIR image data; or a refresh rate of the one or more active NIR cameras.

Example 10

The system of any preceding example, wherein: the system further comprises an active NIR range-finder that includes: an emitter configured to emit NIR radiation; and a detector configured to detect a portion of the NIR radiation reflected from the object over a time period and provide dynamic NIR range data based on the detected portion of the NIR radiation reflected from the object; the non-thermal radiation associated with the object comprises a portion of the NIR radiation emitted from the active NIR range-finder and reflected from the object; the non-thermal sensor comprises one or more active NIR cameras, the one or more NIR cameras configured to provide the non-thermal data based on the NIR radiation reflected from the object; the non-thermal data comprises NIR image data; and the processor is further configured to determine a motion of the object in the FOV of the thermal sensor, relative to the system, based on one or more of: a geometrical configuration of the emitters and detectors of the active NIR range-finder; a relative target distance between the system and the object, the relative target distance based on the range data; an amount of frame-to-frame overlap between sequential images extracted from the NIR image data; or a refresh rate of the one or more active NIR cameras.

Example 11

The system of any preceding example, wherein: the system further comprises an active NIR range-finder that includes: an emitter configured to emit NIR radiation; and a detector configured to detect a portion of the NIR radiation reflected from the object over a time period and provide dynamic NIR range data based on the detected portion of the NIR radiation reflected from the object; and the processor is further configured to: determine a temperature gradient across an edge of the object based on the thermal data; and determine a motion of the object in the FOV of the thermal sensor, relative to the system, based on one or more of: the dynamic NIR range data; or the temperature gradient.

Example 12

A system comprising: a thermal sensor configured to detect thermal radiation emitted from an object and provide thermal data, based on the thermal radiation; an emitter configured to emit electromagnetic (EM) radiation; a detector configured to detect a portion of the EM radiation that is reflected from the object and provide range data based on the detected EM radiation; a non-thermal sensor configured to detect non-thermal radiation associated with the object and provide non-thermal data, based on the non-thermal radiation; and a processor configured to: detect the object in a field-of-view (FOV) of the thermal sensor and the other sensor based on one or more of the thermal data, the non-thermal data, or the range data; and determine a distance between the system and the object based on one or more of the thermal data, the non-thermal data, or the range data.

Example 13

The system of any preceding example, wherein the EM radiation comprises near-infrared (NIR) radiation.

Example 14

The system of any preceding example, wherein the non-thermal sensor comprises: one or more active NIR cameras configured to use the NIR radiation emitted from the emitter as a source of illumination; one or more visible-light cameras; or at least one NIR camera configured to use the NIR radiation emitted from the emitter as a source of illumination and at least one visible-light camera.

Example 15

A method comprising: receiving, by a processor, thermal data from a thermal sensor, the thermal data based on thermal radiation detected by the thermal sensor and emitted from an object in a field-of-view (FOV) of the thermal sensor, from a background around the object, or from both the object and the background; receiving, by the processor, non-thermal data from a non-thermal sensor, the non-thermal data based on non-thermal radiation associated with the object and detected by the non-thermal sensor; detecting the object, by the processor and based on either or both of the thermal data or the non-thermal data; and determining, by the processor, a distance between the object-detection system and the object based on at least one of the thermal data or the non-thermal data.

Example 16

The method of any preceding example, wherein: the thermal data comprises sequential differential temperature data, the sequential differential temperature data indicating a change in thermal radiation emitted from the object and from the background around the object over a time period, and the method further comprises: receiving, by the processor, dynamic NIR range data from an active near-infrared (NIR) range-finder, the active NIR range-finder comprising an emitter configured to emit NIR radiation and a detector configured to detect a portion of the NIR radiation reflected from the object over a time period and provide the dynamic NIR range data based on the detected portion of the NIR radiation reflected from the object; receiving the sequential differential temperature data from the thermal sensor over the time period; determining, by the processor, a temperature gradient between the object and the background, over the time period, the temperature gradient based on at least the sequential differential temperature data; and verifying, by the processor, that the object exists based on at least the dynamic NIR range data and the temperature gradient.

Example 17

The method of any preceding example, wherein verifying that the object exists based on the dynamic NIR range data and the temperature gradient further comprises: detecting the object based on the dynamic NIR range data; determining the temperature gradient by: determining an average rate of change of an amount of thermal radiation emitted from the object over the time period; determining an average rate of change of an amount of thermal radiation emitted from the background around the object over the time period; and comparing the average rates of change of the amounts of thermal radiation emitted from the object and from the background around the object over the time period; and verifying that the object exists, based on a result of the comparing indicating that the average rate of change of the amount of thermal radiation emitted from the object over the time period has decreased relative to the average rate of change of the amount of thermal radiation emitted from the background.

Example 18

The method of any preceding example, wherein: the thermal data comprises thermal image data; the non-thermal sensor comprises one or more active NIR cameras, the one or more active NIR cameras including, or associated with, an emitter that can emit NIR radiation; the non-thermal data comprises NIR image data received from the one or more active NIR cameras, the NIR image data based on reflections of at least a portion of the NIR radiation that is reflected from the object and detected by the one or more active NIR cameras; and the method further comprises: determining an NIR image of the object, based on the NIR image data; determining a thermal image of the object, based on the thermal image data; and detecting the object based on a pattern-matching technique using the NIR image of the object and the thermal image of the object.

Example 19

The method of any preceding example, wherein: the thermal data comprises thermal image data; the non-thermal sensor comprises one or more active NIR cameras, the one or more active NIR cameras including, or associated with, an emitter that can emit NIR radiation; the non-thermal data comprises NIR image data received from the one or more active NIR cameras, the NIR image data based on reflections of at least a portion of the NIR radiation that is reflected from the object and detected by the one or more active NIR cameras over a time period; and the method further comprises: determining the distance between the one or more active NIR cameras and the object based on a stereoscopic image-processing technique using corresponding time-aligned images extracted from the thermal data and from the NIR data.

Example 20

The method of any preceding example, further comprising: receiving dynamic range data from an active near-infrared (NIR) range-finder, the active NIR range-finder comprising an emitter configured to emit NIR radiation and a detector configured to detect a portion of the NIR radiation reflected from the object over a time period and provide the dynamic NIR range data based on the detected portion of the NIR radiation reflected from the object; and determining the distance between the active NIR range-finder and the object based on a time-of-flight technique using the dynamic NIR range data.

Example 21

A system comprising means for performing any of the methods of the preceding examples.

Example 22

The system of any of the preceding examples comprising at least one processor configured to perform any of the methods of the preceding examples.

Example 23

A computer-readable storage medium comprising instructions that when executed configure a processor to perform any of the methods of the preceding examples.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A system comprising:
a thermal sensor configured to detect thermal radiation emitted from an object in a field-of-view (FOV) of the thermal sensor and from a background around the object and provide thermal data, based on the thermal radiation;
a non-thermal sensor configured to detect non-thermal radiation associated with the object and provide non-thermal data, based on the non-thermal radiation;
an active near-infrared (NIR) range-finder that includes:
an emitter configured to emit NIR radiation; and
a detector configured to detect a portion of the NIR radiation reflected from the object over a time period and provide dynamic NIR range data based on the detected portion of the NIR radiation reflected from the object; and
a processor configured to:
receive the thermal data and the non-thermal data;
detect the object, based on at least one of the thermal data or the non-thermal data;
determine a temperature gradient across an edge of the object based on the thermal data; and
determine a size or a motion of the object in the FOV of the thermal sensor, relative to the system, based on one or more of the dynamic NIR range data or the temperature gradient.

2. The system of claim 1, wherein:
the thermal sensor is further configured to provide the thermal data over the time period;
the thermal data comprises sequential differential temperature data, the sequential differential temperature data indicating a difference between thermal radiation emitted from the object and from the background around the object over the time period; and
the processor is further configured to:
detect the object in the FOV, based on the dynamic NIR range data;
determine the temperature gradient between the object and the background, over the time period, the temperature gradient based on at least the sequential differential temperature data; and
verify that the object exists, based on at least the dynamic NIR range data and the temperature gradient.

3. The system of claim 2, wherein the processor is further configured to verify that the object exists, based on at least the dynamic NIR range data and the temperature gradient, by:
detecting the object, based on the dynamic NIR data;
determining the temperature gradient by:
determining an average rate of change of an amount of thermal radiation emitted from the object over the time period;
determining an average rate of change of an amount of thermal radiation emitted from the background around the object over the time period; and
comparing the average rates of change of the amounts of thermal radiation emitted from the object and from the background around the object over the time period; and
verifying that the object exists, based on a result of the comparing indicating that the average rate of change of the amount of thermal radiation emitted from the object over the time period has decreased, relative to the average rate of change of the amount of thermal radiation emitted from the background.

4. The system of claim 2, wherein a difference between a temperature of the object and a temperature of the background around the object is between approximately 0.25 degrees Celsius and approximately 6 degrees Celsius.

5. The system of claim 1, wherein:
the non-thermal sensor comprises one or more active near-infrared (NIR) cameras, the one or more NIR cameras configured to provide the non-thermal data based on the NIR radiation reflected from the object;
the non-thermal data comprises NIR image data;
the thermal data comprises thermal image data; and
the processor is further configured to:
  determine an NIR image of the object, based on the NIR image data;
  determine a thermal image of the object, based on the thermal image data; and
  detect the object in the FOV of the thermal sensor and the non-thermal sensor, based on a pattern-matching technique and using the NIR image of the object and the thermal image of the object.

6. The system of claim 1, wherein:
the non thermal radiation associated with the object comprises a portion of the NIR radiation emitted from the active NIR range finder and reflected from the object;
the non-thermal sensor comprises one or more active NIR cameras, the one or more NIR cameras configured to provide the non-thermal data based on the NIR radiation reflected from the object;
the non-thermal data comprises NIR image data;
the thermal data comprises thermal image data; and
the processor is further configured to determine a distance between the system and the object based on a stereoscopic image-processing technique using corresponding time-aligned images extracted from the thermal image data and the NIR image data.

7. The system of claim 1, wherein:
the processor is further configured to determine a distance between the NIR range-finder and the object based on a time-of-flight technique using the dynamic NIR range data.

8. The system of claim 1, wherein:
the non-thermal sensor comprises one or more active NIR cameras, the one or more NIR cameras configured to provide the non-thermal data based on the NIR radiation reflected from the object;
the non-thermal data comprises NIR image data;
the thermal data comprises thermal image data; and
the processor is further configured to determine a distance between the system and the object based on:
  a stereoscopic image-processing technique using corresponding time-aligned images extracted from the thermal image data and the NIR image data; and
  a time-of-flight technique using the dynamic NIR range data.

9. The system of claim 1, wherein:
the non-thermal sensor comprises one or more active NIR cameras, the one or more NIR cameras configured to provide the non-thermal data based on the NIR radiation reflected from the object;
the non-thermal data comprises NIR image data; and
the processor is further configured to determine a size of the object based on one or more of:
  a geometrical configuration of the emitter and detector of the active NIR range-finder;
  a relative target distance between the system and the object, the relative target distance based on the dynamic NIR range data;
  an amount of frame-to-frame overlap between sequential images extracted from the NIR image data; or
  a refresh rate of the one or more active NIR cameras.

10. The system of claim 1, wherein:
the non thermal radiation associated with the object comprises a portion of the NIR radiation emitted from the active NIR range finder and reflected from the object;
the non-thermal sensor comprises one or more active NIR cameras, the one or more NIR cameras configured to provide the non-thermal data based on the NIR radiation reflected from the object;
the non-thermal data comprises NIR image data; and
the processor is further configured to determine a motion of the object in the FOV of the thermal sensor, relative to the system, based on one or more of:
  a geometrical configuration of the emitters and detectors of the active NIR range-finder;
  a relative target distance between the system and the object, the relative target distance based on the range data;
  an amount of frame-to-frame overlap between sequential images extracted from the NIR image data; or
  a refresh rate of the one or more active NIR cameras.

11. The system of claim 1, wherein the non-thermal sensor comprises:
one or more active NIR cameras configured to use the NIR radiation emitted from the emitter as a source of illumination;
one or more visible-light cameras; or
at least one NIR camera configured to use the NIR radiation emitted from the emitter as a source of illumination and at least one visible-light camera.

12. A system comprising:
a thermal sensor configured to detect thermal radiation emitted from an object in a field-of-view (FOV) of the thermal sensor and from a background around the object and provide thermal data, based on the thermal radiation;
a non-thermal sensor configured to detect non-thermal radiation associated with the object and provide non-thermal data, based on the non-thermal radiation;
an active NIR range-finder that includes:
  an emitter configured to emit NIR radiation; and
  a detector configured to detect a portion of the NIR radiation reflected from the object over a time period and provide dynamic NIR range data based on the detected portion of the NIR radiation reflected from the object;
the non-thermal radiation associated with the object comprises a portion of the NIR radiation emitted from the active NIR range-finder and reflected from the object;
the non-thermal sensor comprises one or more active NIR cameras, the one or more NIR cameras configured to provide the non-thermal data based on the NIR radiation reflected from the object;
the non-thermal data comprises NIR image data; and
a processor configured to:
  receive the thermal data and the non-thermal data; and
  detect the object, based on at least one of the thermal data or the non-thermal data determine a size of the object based on one or more of:
    a geometrical configuration of the emitter and detector of the active NIR range-finder;

a relative target distance between the system and the object, the relative target distance based on the dynamic NIR range data;
an amount of frame-to-frame overlap between sequential images extracted from the NIR image data; or
a refresh rate of the one or more active NIR cameras.

13. The system of claim 12, wherein:
the processor is further configured to determine a motion of the object in the FOV of the thermal sensor, relative to the system, based on one or more of:
the geometrical configuration of the emitters and detectors of the active NIR range-finder;
the relative target distance between the system and the object, the relative target distance based on the range data;
the amount of frame-to-frame overlap between sequential images extracted from the NIR image data; or
the refresh rate of the one or more active NIR cameras.

14. The system of claim 12, wherein:
the thermal data comprises thermal image data; and
the processor is further configured to:
determine an NIR image of the object, based on the NIR image data;
determine a thermal image of the object, based on the thermal image data; and
detect the object in the FOV of the thermal sensor and the non-thermal sensor, based on a pattern-matching technique and using the NIR image of the object and the thermal image of the object.

15. The system of claim 12, wherein:
the thermal data comprises thermal image data; and
the processor is further configured to determine a distance between the system and the object based on a stereoscopic image-processing technique using corresponding time-aligned images extracted from the thermal image data and the NIR image data.

16. The system of claim 12, wherein:
the thermal data comprises thermal image data; and
the processor is further configured to determine a distance between the system and the object based on:
a stereoscopic image-processing technique using corresponding time-aligned images extracted from the thermal image data and the NIR image data; and
a time-of-flight technique using the dynamic NIR range data.

17. A system comprising:
a thermal sensor configured to detect thermal radiation emitted from an object in a field-of-view (FOV) of the thermal sensor and from a background around the object and provide thermal data, based on the thermal radiation;
a non-thermal sensor configured to detect non-thermal radiation associated with the object and provide non-thermal data, based on the non-thermal radiation;
an active NIR range-finder that includes:
an emitter configured to emit NIR radiation; and
a detector configured to detect a portion of the NIR radiation reflected from the object over a time period and provide dynamic NIR range data based on the detected portion of the NIR radiation reflected from the object;
the non-thermal radiation associated with the object comprises a portion of the NIR radiation emitted from the active NIR range-finder and reflected from the object;
the non-thermal sensor comprises one or more active NIR cameras, the one or more NIR cameras configured to provide the non-thermal data based on the NIR radiation reflected from the object;
the non-thermal data comprises NIR image data; and
a processor configured to:
receive the thermal data and the non-thermal data; and
detect the object, based on at least one of the thermal data or the non-thermal data determine a motion of the object based on one or more of:
a geometrical configuration of the emitter and detector of the active NIR range-finder;
a relative target distance between the system and the object, the relative target distance based on the dynamic NIR range data;
an amount of frame-to-frame overlap between sequential images extracted from the NIR image data; or
a refresh rate of the one or more active NIR cameras.

18. The system of claim 17, wherein
the processor is further configured to determine a size of the object in the FOV of the thermal sensor, relative to the system, based on one or more of:
the geometrical configuration of the emitters and detectors of the active NIR range-finder;
the relative target distance between the system and the object, the relative target distance based on the range data;
the amount of frame-to-frame overlap between sequential images extracted from the NIR image data; or
the refresh rate of the one or more active NIR cameras.

19. The system of claim 17, wherein:
the thermal data comprises thermal image data; and
the processor is further configured to determine a distance between the system and the object based on a stereoscopic image-processing technique using corresponding time-aligned images extracted from the thermal image data and the NIR image data.

20. The system of claim 17, wherein:
the thermal data comprises thermal image data; and
the processor is further configured to determine a distance between the system and the object based on:
a stereoscopic image-processing technique using corresponding time-aligned images extracted from the thermal image data and the NIR image data; and
a time-of-flight technique using the dynamic NIR range data.

* * * * *

UNITED STATES PATENT AND TRADEMARK OFFICE
CERTIFICATE OF CORRECTION

| | |
|---|---|
| PATENT NO. | : 11,914,679 B2 |
| APPLICATION NO. | : 17/394903 |
| DATED | : February 27, 2024 |
| INVENTOR(S) | : Yew Kwang Low et al. |

It is certified that error appears in the above-identified patent and that said Letters Patent is hereby corrected as shown below:

In the Claims

At Column 23, Claim 6, Lines 23-26, delete "the non thermal radiation associated with the object comprises a portion of the NIR radiation emitted from the active NIR range finder and reflected from the object;"

At Column 24, Claim 10, Lines 8-11, delete "the non thermal radiation associated with the object comprises a portion of the NIR radiation emitted from the active NIR range finder and reflected from the object;"

Signed and Sealed this
Twenty-fifth Day of March, 2025

Coke Morgan Stewart
*Acting Director of the United States Patent and Trademark Office*